United States Patent
Ebin

[15] 3,678,956
[45] July 25, 1972

[54] REDUNDANT SEAL BALL VALVE

[72] Inventor: Joseph A. Ebin, Los Angeles, Calif.

[73] Assignee: Lockheed Aircraft Corporation, Burbank, Calif.

[22] Filed: Dec. 21, 1970

[21] Appl. No.: 100,320

[52] U.S. Cl..............................137/242, 251/172, 251/174, 251/315, 251/317
[51] Int. Cl..........................................F16k 5/16
[58] Field of Search................137/248; 251/172, 174, 315, 251/317

[56] References Cited

UNITED STATES PATENTS

| 3,521,855 | 7/1970 | Jensen | 251/172 |
| 3,047,265 | 7/1962 | Kaiser | 251/172 |
| 3,235,224 | 2/1966 | Grove | 251/174 |
| 3,326,518 | 6/1967 | Grove | 351/172 |
| 3,567,176 | 3/1971 | Johnson | 251/174 |
| 3,164,362 | 1/1965 | Lavigueur | 251/174 |

*Primary Examiner*—Harold W. Weakley
*Attorney*—George C. Sullivan and Ralph M. Flygare

[57] ABSTRACT

A ball valve, primarily for low pressure applications, such as a toilet waste valve for large passenger aircraft, wherein the fluid passing through the open valve may contain solid objects which could damage conventional valve ball seals. The valve embodies a novel redundant wiper-seal construction for the valve inlet, or both the valve inlet and outlet, having a resilient wiper ring with an end wiping surface, and a resilient seal ring softer and more resiliently compliant than the wiper ring, fixed within a concentric seal groove in the wiping surface between its radially inner and outer edges, such that the wiping surface has a wiping face at the inner side of the ring for wiping contact with the valve ball to shield the softer seal ring against contact by any solid objects entering the valve. The valve also embodies a unique hollow thin-walled valve ball construction.

5 Claims, 3 Drawing Figures

Patented July 25, 1972 3,678,956
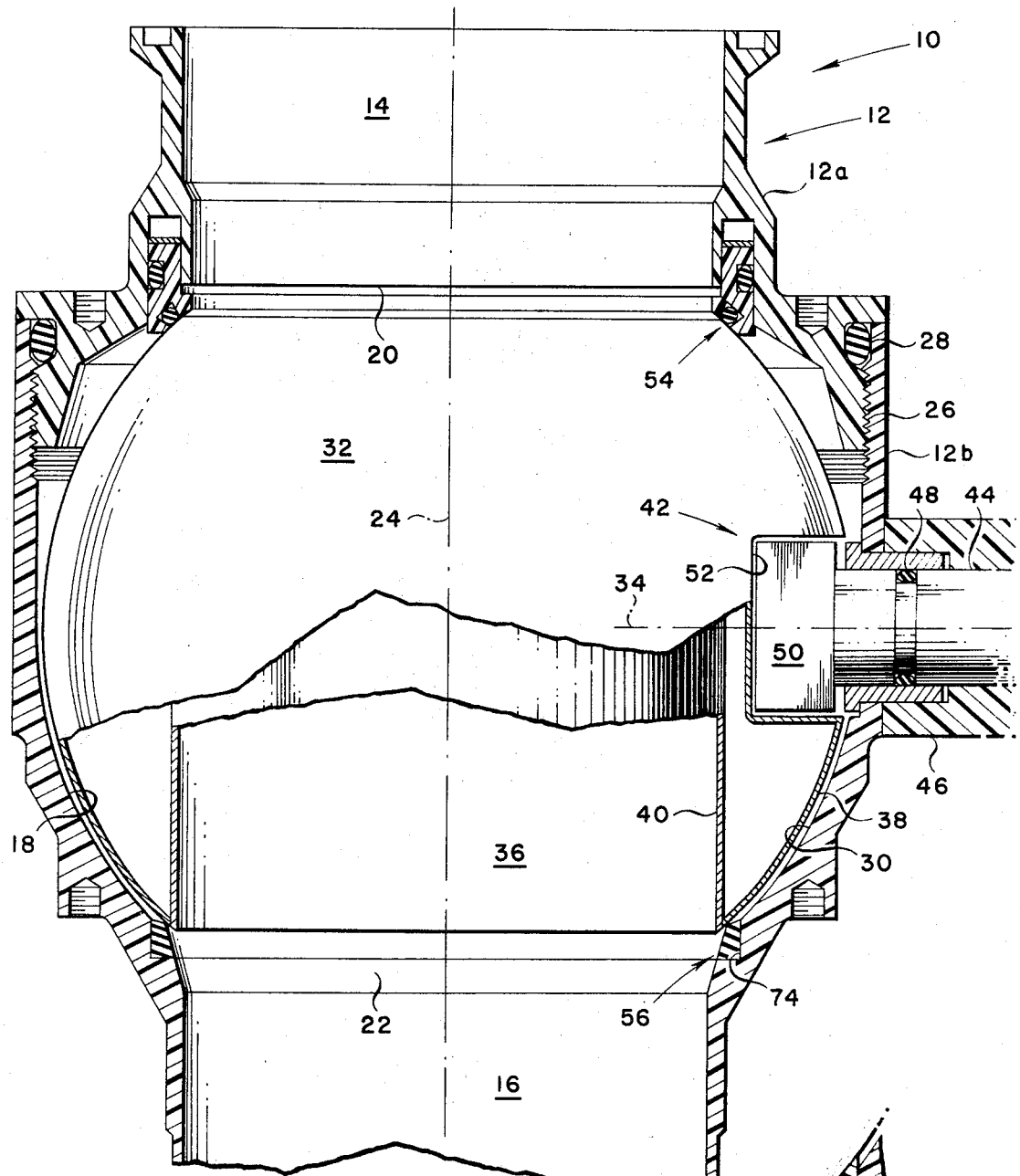
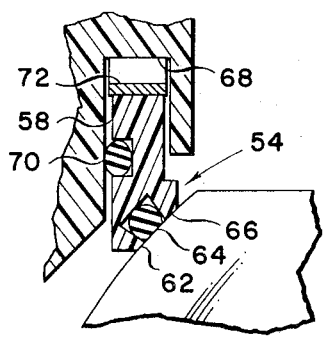
FIG. 1
FIG. 3
FIG. 2
JOSEPH A. EBIN
*INVENTOR.*
BY George C. Sullivan
Ralph M. Flygare
Agents

3,678,956

REDUNDANT SEAL BALL VALVE

BACKGROUND OF THE INVENTION

1. Field

This invention relates generally to valves and more particularly to a ball valve embodying a novel valve ball and redundant wiper-seal therefor.

2. Prior Art

As will appear from the ensuing description, the present ball valve is capable of many diverse uses. However, the valve is intended primarily for use in low pressure systems wherein the fluid passing through the valve may contain solid objects which could damage conventional valve ball seals. More specifically, the valve is especially well suited for use as a toilet waste valve for large passenger aircraft. By way of example, the invention will be described in connection with such use.

The toilet waste system of certain large passenger aircraft embodies a holding tank in which the waste is collected in flight. The collected waste is later drained from the tank after landing. To this end, the collection tank is equipped with a drain or waste valve which is closed in flight and opened after landing to drain the tank.

Most waste systems of this type employ a plunger valve having a flat seat as the waste valve. Since these valves have proven unsatisfactory in certain aspects, it has been proposed to employ ball-type valves. The prior art is replete with a variety of ball valves of the general type herein considered. By way of example, U.S. Pat. Nos. 3,083,945; 3,455,534; and 3,484,079 disclose ball valves that may be used as an aircraft waste valve. However, all known prior art ball valves have a number of serious shortcomings. First, the prior valves are generally designed for relatively high pressure systems and are thus quite complex and heavy. Gate valves have been found to have excessively large housings. Also, the seals employed in ball-type high pressure valves of the prior art are more sophisticated and heavier than they need be in a low pressure waste valve. Secondly, those prior valves which are designed for low pressure use generally employ simple valve ball seal rings which are unreliable for use in an aircraft waste valve. This is due to the fact that the collected waste often contains solid objects, such as hair pins, broken liquor bottles, and the like which frequently become wedged between the seal rings, particularly the inlet seal ring, and the valve ball and thereby result in leakage when the valve is closed and/or damage the seal such that it must be frequently replaced.

SUMMARY OF THE INVENTION

The present ball valve is designed to overcome the above disadvantages of the prior ball valves. According to one of its important aspects, the invention provides a unique wiper-seal construction for the valve ball which serves the dual function of sealing the ball to the valve housing about the valve inlet, or about both the valve inlet and outlet, and shielding the seal ring against contact with solid objects in the fluid stream passing through the valve. To this end the seal includes a resilient wiper ring with a wiping surface shaped to seat against the exterior surface of the valve ball. Entering this surface between its radially inner and outer edges is a concentric seal groove containing a seal ring which is softer and more resiliently complaint than the wiper ring. The portion of the wiping surface at the radially inner side of the seal ring provides a wiping face.

When this wiper-seal assembly is installed in the ball valve, the seal ring is disposed in sealing contact with the exterior valve ball surface. The inner wiping face of the wiper ring is disposed in wiping contact with the ball surface to prevent contact with the softer seal ring of any solid objects entering the valve. In the disclosed embodiments, the wiper ring of the inlet seal slides in an annular recess surrounding the inlet passage and is yieldably urged against the ball by a spring. The wiper ring contains a second relatively soft seal ring which seals the latter to a wall of the recess.

Another aspect of the invention concerns the construction of the valve ball itself. This valve ball has a hollow thin-walled construction including an outer spherically curved wall and a sleeve extending diametrically through and joined at its ends to the outer wall to provide a flow passage through the ball. The ball may be rotated to open and close the valve by means of a shaft journalled in the valve housing and having an inner non-circular head engaging in a mating non-circular socket in the ball formed by an indentation in the outer wall of the socket.

BRIEF DESCRIPTION OF THE DRAWINGS

FIG. 1 is an axial section through a ball valve of the invention;

FIG. 2 is an enlarged section through the inlet valve ball seal of the valve; and FIG. 3 is an enlarged section through an alternative outlet valve ball seal which may be employed in the valve.

DETAILED DESCRIPTION OF THE SHOWN EMBODIMENT

The ball valve 10 illustrated in FIGS. 1 and 2 has a valve body 12 with an inlet passage 14, an outlet passage 16, and an interposed valve ball cavity 18. Passages 14 and 16 open to the cavity through inlet and outlet ports 20, 22 located on a common axis 24. The illustrated valve body 12 is constructed in two sections 12, 12b which are threadedly joined at 26, and sealed to one another by an o-ring 28. In a preferred construction, the valve body 12 is fabricated from a lightweight plastic. The inlet and outlet passages 14, 16 extend straight through the body on the axis 24. The lower valve body section 12b has a lower interior, spherically curved wall surface 30 surrounding and extending inwardly to the outlet 16.

Contained within the body cavity 18 is a valve ball 32. This valve ball is rotatable about diametrical axis 34 of the ball, normal to and intersecting the common axis 24 of the valve passages 14, 16. Extending diametrically through the ball on an axis normal to and intersecting its rotation axis 34 is a flow passage 36 of substantially the same diameter as the valve body ports 20, 22. This arrangement provides an unimpeded full-flow passage which precludes undesirable accumulation of particulate or other solid matter in the passageway. The valve body 12 and the valve ball 32 may be solid and molded from plastic, particularly in the waste valve application referred to earlier. However, in the preferred construction illustrated, the valve ball comprises a hollow thin-walled structure. Also, the hollow-metal construction is preferred for the reason that it is more scratch resistant than plastic.

Thus, the ball has an outer spherically curved wall 38 and an inner sleeve 40 extending diametrically through and joined at its ends to the outer wall. The sleeve forms the ball passage 36. The spherical interior wall portion 30 is generated about the point occupied by the center of the valve ball 32 when positioned in the body cavity 18 and has a radius of curvature slightly greater than the ball, such that a slight clearance exists between the wall and ball, as shown. If desired, the hollow metal ball 32 may have an external adherent coating of polytetrafluorethylene to prevent accumulation of solid matter on the ball.

Valve ball 32 is rotatable on its turning axis 34 between open and closed positions. When the ball occupies its illustrated open position, the ball passage 36 is coaxially aligned with and communicates the body inlet and outlet ports 20, 22. When in closed position, the ball is rotated 90° to a position wherein the ball passage extends transversely of the common port axis 24, and the outer spherical wall 38 of the ball extends across and closes both ports.

Means 42 are provided for turning the valve ball 32 between its open and closed positions. In this instance the turning means comprises a shaft 44 journalled in a bearing sleeve 46 secured to the lower valve body section 12b on the ball rotation axis 34. The shaft is sealed by an O-ring 48. The outer end of the shaft is accessible for turning by hand or other suitable means. On the inner end of the shaft 44 is an enlarged non-circular, i.e., rectangular, head 50. This head fits closely within a socket or channel 52 in the valve ball formed by an indentation in its outer spherical wall 38. The head 50 and channel 52 together form a coupling between the ball 32 and shaft 44 which permits the ball to be turned to open and closed positions by the shaft.

The primary feature of the invention resides in the means for sealing the valve ball 32 to the valve body 12 about the inlet and outlet ports 20,22. Heretofore certain ball valves incorporated dual seals wherein one seal is used on the upstream side and the other is used to seal the downstream side where reverse flows are encountered. In the novel redundant sealing system of the present invention both the upstream and the downstream seals each comprise double seals. That is, each comprises an internal and an external seal. The external seal functions primarily as a seal carrier and wiper which contains and protects the softer static seal. In a practical construction, such sealing means comprise an inlet seal 54 about the inlet port and an outlet seal 56 about the outlet port. The inlet seal 54 comprises a resilient wiper ring 58 with a cylindrical body 60 and a generally internally beveled end forming a wiping surface 62 for engaging the outer surface of the valve ball 32. This wiping surface is preferably concave and spherically curved to the same radius as the ball. Entering the wiping surface 62 between its radially inner and outer edges is a coaxial seal groove containing a resilient seal ring 64. Seal ring 64 is softer and more resiliently compliant than the wiper ring 58 and, when unstressed, protrudes a small distance beyond the wiping surface. The portion of the wiping surface 62 at the inner side of the seal ring 64 forms a wiping face 66.

Concentrically surrounding the inlet port 20 of the valve body 12 is a cylindrical recess 68 which opens toward the valve ball 32 and slidably or loosely receives the wiper ring body 60. In one cylindrical side of the body is a seal groove containing a second seal ring 70 for sealing the ring to the confronting wall of the recess 68. Seal ring 70, like seal ring 64, is softer and more complaint than the wiper ring.

The wiper ring 60 and seal rings 64, 70 may be constructed of various materials. Preferably, however, the wiper ring is constructed of plastic material and the seal rings of rubber material.

Between the bottom wall of the recess 68 and the wiper ring 60 is a wave spring 72 for urging the ring against the valve ball 32. This spring exerts sufficient force on the wiper ring to compress the seal ring 64 flush with the wiping surface 62 and urge the wiping face 66 into wiping contact with the ball. The seal ring 64 provides a liquid seal between the valve body 12 and valve ball 32 to prevent leakage. The wiping face 66 prevents contact with the softer seal ring 64 of solid articles, such as hair pins, etc., entering the valve, thereby preventing leaks and damage to the seal ring.

The outlet seal 56 is a simple seal ring fitted within a recess 74 in the valve body 12 about the outlet port 22 and disposed in sealing contact with the valve ball 32. However, if desired, the outlet seal may comprise a resilient wiper ring 76 and seal ring 78 (FIG. 3) similar to the inlet seal 54 except that the wiper ring 76 is positioned stationary in the body recess 74 rather than sliding in the recess, as does the wiper ring of the inlet seal. The downstream seal and carrier function by differential pressure and fluid (head) pressure urging the ball against the seal.

As can be seen, neither the inlet dual seal nor the outlet seal is located within the flow passageway when the valve is open. Thus, an unimpeded full-flow opening is available as is highly desirable for use in systems carrying a slurry or particulate matter.

It will now be understood that when the valve is open, the seals 54, 56 provide seals about the valve passages 14, 16, 36. When the valve is closed, the seals seal the valve body to the spherical surface of the valve ball 32. As will be apparent to those versed in the art, stops may be provided in the shaft housing to properly align the ball in its open and closed positions.

What is claimed is:

1. A ball valve comprising:
   a valve body, having a throughflow passage therein with inlet and outlet ports, comprising first and second separable sections joined via mating end portions coaxially disposed with respect to said passage, and having an annular seal retaining recess formed in the outer periphery of one of said end portions and closed by the facing interior wall of the other of said end portions;
   a resilient O-ring disposed within said seal retaining recess thereby providing a fluid-tight junction between said first and second separable sections;
   a hollow thin-walled valve ball, having an outer spherically curved wall and an interiorly disposed cylindrical sleeve defining a flow conduit extending centrally through said ball and joined at its ends to said outer wall, said ball being rotatable on a diametral axis within said passage between an open position, wherein the flow conduit through said ball is coaxially aligned and communicates with said inlet and outlet ports, and a closed position wherein said flow conduit is transversely positioned with respect to said inlet and outlet ports;
   selectively engageable shaft coupling means disposed on one side of said outer wall of said valve ball for rotation therewith;
   a rotatable shaft accessible externally of, and journalled in, one wall of said second section of said valve body on a diametral axis of said ball normal to the plane of rotation of said ball passage axis, said shaft having an annular seal-receiving groove therein at a location adjoining the journalled portion of said valve body wall;
   a resilient shaft seal ring disposed in a fluid-tight relationship in said seal-receiving groove of said shaft;
   a non-circular head on the inner end of said shaft selectively engageable with said coupling means for rotation of said ball by said shaft;
   inlet and outlet seals carried by said first and second separable sections, respectively, and disposed about said inlet and outlet ports, respectively, in fluid sealing engagement with said valve ball, said seals engaging the exterior surface of said ball in surrounding relation to the ends of said flow conduit when said ball valve is in the open position, and in circumferentially spaced relation to said flow conduit ends when said ball is in the closed position; and
   said inlet seal including a resilient wiper ring having an annular wiping surface engaging said valve ball surface and a concentric annular seal groove therein entering said wiping surface between the radially inner and outer circumferential edges of said wiping surface so as to provide said wiper ring with a radially inner wiping face between said groove and inner edge, and a resilient seal ring carried within said seal groove and engaging said valve ball surface, said seal ring being softer and more resiliently compliant than said wiping face of said wiper ring, and said wiping face engaging said valve ball surface between said inlet port and seal ring to shield said seal ring against contact with any solid objects entering said valve.

2. A ball valve according to claim 1, wherein said outlet seal comprises:
   a second resilient wiper ring having an annular wiping surface engaging said valve ball surface and a concentric annular seal groove entering said latter wiping surface between the radially inner and outer circumferential edges of the latter surface so as to provide said second wiper ring with a radially inner wiping face between said later groove and inner edge, and a second resilient seal ring fixed within said latter groove and engaging said valve ball surface, said second seal ring being softer and more resiliently compliant than said second wiper ring engaging said valve ball surface between said outlet port and second seal ring to shield the latter ring against contact with any solid objects entering said valve.

3. A ball valve according to claim 1 wherein said wiper ring includes:
a cylindrical body slidable within a cylindrical recess concentrically surrounding said inlet passage and opening to said body cavity;
means sealing said wiper ring body to said valve body; and
a wave spring yieldably urging said wiper ring against said valve ball.

4. A ball valve according to claim 3 wherein said wiper ring sealing means comprises:

a second seal groove entering one cylindrical surface of said wiper ring body; and
a second seal ring softer and more resiliently compliant than said wiper ring fixed within said second groove and engaging the confronting cylindrical wall of said recess.

5. A ball valve according to claim 1 wherein said ball includes:
an external adherent coating of polytetrafluorethylene.

* * * * *